No. 794,995. PATENTED JULY 18, 1905.
M. MILCH.
ALTERNATING CURRENT MOTOR.
APPLICATION FILED DEC. 21, 1903.
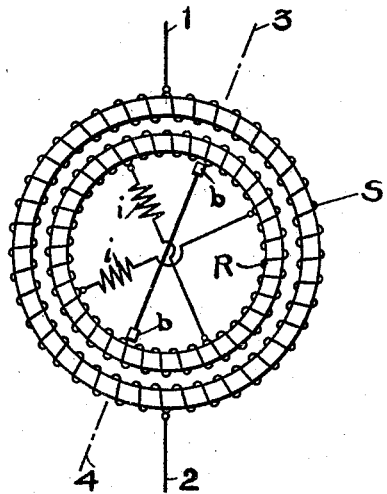
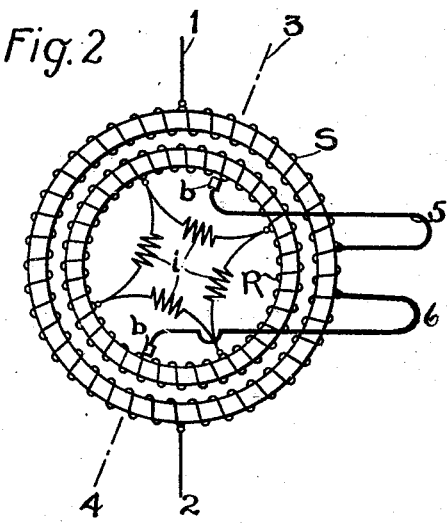
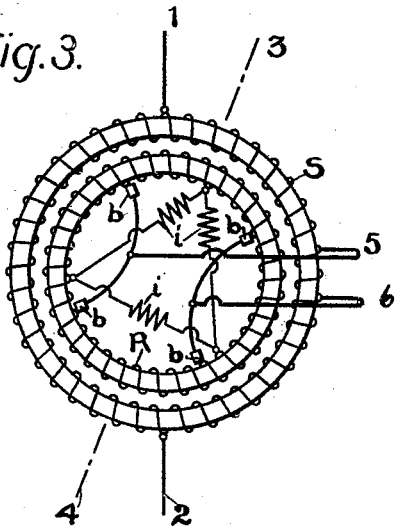
Witnesses.
Inventor.
Maurice Milch No. 794,995. Patented July 18, 1905.

UNITED STATES PATENT OFFICE.

MAURICE MILCH, OF SCHENECTADY, NEW YORK, ASSIGNOR TO GENERAL ELECTRIC COMPANY, A CORPORATION OF NEW YORK.

ALTERNATING-CURRENT MOTOR.

SPECIFICATION forming part of Letters Patent No. 794,995, dated July 18, 1905.

Application filed December 21, 1903. Serial No. 185,944.

*To all whom it may concern:*

Be it known that I, MAURICE MILCH, a subject of the Emperor of Austria-Hungary, residing at Schenectady, in the county of Schenectady and State of New York, have invented certain new and useful Improvements in Alternating-Current Motors, of which the following is a specification.

My invention relates to alternating-current motors, and more particularly to motors of the repulsion type. The repulsion-motor as ordinarily constructed has the characteristics of the direct-current series motor—that is, it has a maximum torque at starting and the speed increases with the decrease of load. Such a motor is eminently suited for railway-work; but for certain classes of work, particularly for operating elevators and some machine-tools, it has the serious disadvantage that its speed is not limited, so that with a light load or with a load driving the motor, as is frequently the case in the operation of elevators, the speed may reach a dangerous value.

The object of my invention is to produce a self-starting single-phase commutator-motor which has a speed limit at or near synchronism. The motor which I have devised has a large starting torque and has a speed which increases with the decrease of load; but near synchronism the torque falls off rapidly, as in the ordinary induction-motor. At a speed above synchronism the torque becomes negative—that is, the motor acts as a brake returning current to the line. In an application for Letters Patent, Serial No. 176,607, filed by me August 12, 1903, I have shown the general principle by which this result may be obtained. The arrangement in the application just mentioned consists of brushes and their connections properly arranged to secure the desired end, the brushes being arranged in the form of polyphase connections to the rotor. In the arrangement there shown the brushes carry the full rotor-current under all working conditions of the motor.

My present invention consists of a modification of the arrangements described in my former application by which the rotor-current is automatically shifted from the brushes to permanent connections across the rotor. This advantage is obtained by my present invention without departing from the advantages secured by the arrangements set forth in my former application for Letters Patent.

A further object of my invention is to provide means for compensating for the magnetizing-current of the motor in such manner that the power factor of the motor may be raised to the value of unity or, if desired, may be caused to take leading currents from the line.

My invention will be best understood by reference to the accompanying drawings, in which—

Figure 1 shows a motor arranged in accordance with my invention. Fig. 2 shows a modified form in which the cross connections of the rotor are differently arranged and the circuit of the short-circuiting brushes is opened to receive the compensating magnetizing-current, and Fig. 3 shows a different arrangement of brushes and short-circuiting connections and another method of impressing upon the brushes the necessary current for compensating purposes.

In Fig. 1, S represents the stator or field of the motor, which is shown as an ordinary Gramme ring with terminals 1 2. When these terminals are connected to a source of alternating-current supply, a magnetization of the motor is produced along the line of the terminals 1 2. R represents the rotor of the motor, which is also shown as an ordinary Gramme ring provided with the short-circuiting brushes *b b*, placed upon the line 3 4, which is displaced from the line 1 2 by the usual angle for repulsion-motors. So far my motor is a repulsion-motor of the ordinary type; but in addition to the short-circuiting brushes I provide the impedances *i i*, permanently cross connecting the rotor-winding. These impedances form connections similar to the cross connections ordinarily used in the rotor of a single-phase motor of the induction type. Single-phase induction-motors unless provided with auxiliary starting means have no starting torque, but once started develop a running torque which increases, as the motor speeds up, until a point near synchronism is reached, when the torque falls abruptly and again reaches zero at synchronism. By my invention I combine the characteristics of the single-phase induction-motor near synchronism with the starting characteristics of the repulsion-motor. By providing the impedances $i$ $i$ instead of the ordinary short-circuiting cross connections of an induction-motor the flow of current through the cross connections at starting is reduced to a practically negligible quantity, since at starting the frequency of the current in the rotor-windings is high, and the self-induction of the impedances $i$ $i$ is consequently large. The motor accordingly starts as an ordinary repulsion-motor with a high starting torque. As the motor speeds up, however, the frequency of the rotor-currents diminishes. The self-inductance of the impedances $i$ $i$ falls off at the same rate until when the motor approaches synchronism, the self-induction of the impedances is practically negligible and the motor acts as an ordinary single-phase induction-motor. Practically all the rotor-current flows through the impedances and the short-circuiting brushes carry very little load. Thus by my invention I provide a motor having the starting characteristics of the repulsion-motor and the running characteristics of the single-phase induction-motor, and thus have a motor eminently suitable for all loads where a large starting torque is required and yet where racing under light loads must be prevented.

In Fig. 2 a modification is shown in which each impedance is connected across ninety degrees of the rotor-winding instead of one hundred and eighty degrees. The circuit of the brushes is opened in order that there may be impressed upon them an electromotive force of the proper value to produce a compensating current. In the drawings the leads 5 and 6 from the brushes are shown connected to points on the stator-windings suitable for furnishing the desired compensating electromotive force. It is not essential that this particular arrangement for obtaining a compensating electromotive force be employed. This electromotive force may be obtained in any other suitable manner from the supply-circuit of the motor or from an independent source. Several different ways of deriving this compensating voltage are shown in my former application, Serial No. 176,607. For my present invention it is only necessary to understand that a low voltage at constant potential shall be impressed upon the leads 5 6. At starting this small voltage is overpowered by the voltage induced in the rotor-windings and the motor acts as though the brushes were short-circuited. As the motor speeds up, the small impressed voltage acts to force a compensating current through the rotor-brushes. Ordinarily the value of the compensating voltage will be selected to properly compensate for the magnetizing-current, so as to produce operation of the motor at unity-power factor. It will be understood, however, that the value of the impressed voltage may be varied to either overcompensate or undercompensate the motor, if desired.

In Fig. 3 a different arrangement of impedance connections is shown, as well as a different arrangement of brushes. Two pairs of brushes are shown, and a method of impressing a compensating voltage with this arrangement is illustrated. The operation of this arrangement is the same as has already been described.

Although for the sake of simplicity I have shown a bipolar motor with Gramme-ring windings on stator and rotor, nevertheless it will be understood that my invention is not limited to this particular form, but is equally applicable to motors of any number of poles and with any of the well-known forms of winding. Accordingly I do not desire to limit myself to the particular construction and arrangement of parts here shown, since changes therein which do not depart from the spirit of my invention and which are within the scope of the appended claims will be obvious to those skilled in the art.

What I claim as new, and desire to secure by Letters Patent of the United States, is—

1. In a dynamo-electric machine, a field-winding, a rotor-winding provided with a commutator, short-circuiting brushes coacting with said rotor-winding, and impedances cross connecting said rotor-winding.

2. In a dynamo-electric machine, a field-winding, a rotor-winding provided with a commutator, short-circuiting brushes coacting with said rotor-winding and displaced from the line of magnetization of said field-winding, and impedances cross connecting said rotor-winding.

3. In a dynamo-electric machine, a field-winding, a rotor-winding provided with a commutator, short-circuiting brushes coacting with said rotor-winding, and impedances permanently connected to distributed points on said rotor-winding.

4. In a dynamo-electric machine, a field-winding, a rotor-winding, brushes and connections therefor arranged to short-circuit said rotor-winding on a line displaced from the line of magnetization of said field-winding, and impedances cross connecting said rotor-winding.

5. In a dynamo-electric machine, a field-winding, a rotor-winding provided with a commutator, brushes coacting with said rotor-winding, a source of low potential connected across said brushes, and impedances cross connecting said rotor-winding.

6. In a dynamo-electric machine, a field-winding, a rotor-winding provided with a commutator, brushes for said rotor-winding displaced from the line of magnetization of said field-winding, a source of constant low potential connected to said brushes, and impedances cross connecting said rotor-winding.

7. In a dynamo-electric machine, a single-phase primary member, a secondary member having its winding connected to a commutator, commutator-brushes and short-circuiting connections therefor, polyphase cross connections for said rotor-winding, and impedances inserted in said cross connections.

8. In a dynamo-electric machine, a single-phase primary member, a secondary member having a winding with polyphase cross connections, a commutator connected to said winding, impedances inserted in said cross connections, and short-circuiting brushes coacting with said secondary winding and displaced from the line of magnetization of said primary member.

9. In a dynamo-electric machine, a field-winding, a rotor-winding, impedances cross connecting said rotor-winding, brushes coacting with a commutator connected to said rotor-winding and displaced from the line of magnetization of said field-winding, and means for impressing on said brushes a voltage to compensate for the magnetizing component of the current in the field-winding.

10. In a dynamo-electric machine, a single-phase primary member, a secondary member having a winding with polyphase cross connections, impedances inserted in said cross connections, brushes coacting with a commutator connected to said secondary winding, and a source of electromotive force connected in circuit with said brushes adapted to compensate for the magnetizing component of the primary current.

In witness whereof I have hereunto set my hand this 18th day of December, 1903.

MAURICE MILCH.

Witnesses:
BENJAMIN B. HULL,
HELEN ORFORD.